(12) United States Patent
Long

(10) Patent No.: US 8,437,932 B2
(45) Date of Patent: May 7, 2013

(54) MAIN MODULATION CALIBRATION USING CLUTCH TRIM VALVE

(75) Inventor: Charles F. Long, Pittsboro, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 885 days.

(21) Appl. No.: 12/479,062

(22) Filed: Jun. 5, 2009

(65) Prior Publication Data

US 2010/0312443 A1    Dec. 9, 2010

(51) Int. Cl.
G06F 7/00     (2006.01)
G06F 17/00    (2006.01)
G06F 19/00    (2011.01)

(52) U.S. Cl.
USPC .............................................. 701/68; 701/67

(58) Field of Classification Search .................... 701/67, 701/68
See application file for complete search history.

(56) References Cited

U.S. PATENT DOCUMENTS

| | | |
|---|---|---|
| 3,468,194 A | 9/1969 | Horsch et al. |
| 6,364,811 B1 | 4/2002 | Hubbard et al. |
| 6,382,248 B1 | 5/2002 | Long et al. |
| 6,659,899 B2 | 12/2003 | Naunheimer |
| 6,913,554 B2 | 7/2005 | Younger |
| 7,314,128 B2 | 1/2008 | Gunderson et al. |
| 7,325,885 B2 | 2/2008 | Berger et al. |
| 2007/0099739 A1 | 5/2007 | Foster et al. |
| 2008/0119320 A1 | 5/2008 | Wu et al. |
| 2008/0176709 A1 | 7/2008 | Wu et al. |
| 2008/0190228 A1* | 8/2008 | Long et al. ..................... 74/331 |

OTHER PUBLICATIONS

U.S. Appl. No. 12/423,239, filed Apr. 14, 2009, Wilson et al.
The International Search Report and the Written Opinion of the International Searching Authority, for PCT/US2010/037073, dated Aug. 2, 2010, (20 pages).

* cited by examiner

*Primary Examiner* — Jeffrey Shapiro
(74) *Attorney, Agent, or Firm* — Barnes & Thornburg LLP

(57) ABSTRACT

Various embodiments of methods, apparatus and systems that calibrate main modulation of an elector-hydraulic control system are presented. Some embodiments calibrate regulator control signals that cause a main regulator valve to develop a main line pressure based upon status of a clutch trim valve that develops a clutch feed pressure for a clutch of a transmission.

20 Claims, 9 Drawing Sheets

MAIN MODULATION CALIBRATION USING CLUTCH TRIM VALVE

TECHNICAL FIELD

The present invention relates generally to electro-hydraulic control systems for transmissions, and more particularly to calibrating an electro-hydraulic control system of a transmission.

BACKGROUND

In general, an automatic transmission of a motor vehicle includes a number of selectively engageable friction elements (referred to herein as clutches). Selective engagement/disengagement of the clutches establish speed ratios between the transmission input shaft and the transmission output shaft. In particular, shifting from a currently established speed ratio to a new speed ratio generally involves disengaging a clutch (off-going clutch) associated with the current speed ratio and engaging a clutch (on-coming clutch) associated with the new speed ratio.

The torque capacity of a clutch (on-coming or off-going) involved in a shift is controlled by the fluid pressure that a clutch trim valve supplies to the clutch. The clutch trim valve receives a main line fluid pressure and supplies the clutch with a clutch feed pressure developed from the main line fluid pressure. In a typical system, an electronic control module (ECM) provides a solenoid valve of the clutch trim valve with a control signal. The control signal controls a pilot pressure of the solenoid valve which in turn controls the clutch feed pressure supplied to the clutch.

SUMMARY

According to one aspect of a disclosed embodiment, a method is provided to calibrate modulation of a main line pressure. The method includes generating regulator control signals that cause a main regulator valve to develop a main line pressure having a first pressure level and a control main valve to develop a control main pressure based upon the main line pressure. The method also include generating clutch control signals that cause a clutch trim valve to develop from the control main pressure a clutch control pressure that defines a threshold pressure level, where the threshold pressure level corresponds to a transition point between a regulating state and a non-regulating state of the clutch trim valve. The method further includes adjusting regulator control signals to cause the main regulator valve to adjust the main line pressure toward a second pressure level, and receiving status signals from the clutch trim valve that indicates whether the clutch trim valve is in the regulating state. The method also include generating one or more calibration parameters based upon regulator control signals that caused receipt of status signals that indicate a transition between the regulating state and the non-regulating state, and modulating the main line pressure developed by the main regulator valve by generating further regulator control signals based upon the one or more calibration parameters.

The method may be implemented where the first pressure level is greater than the threshold pressure level, the second pressure level is less than the threshold pressure level, and adjusting regulator control signals causes the main regulator valve to reduce the main line pressure from the first pressure level toward the second pressure level. Such a method may also include generating a status signal that indicates the clutch trim valve has transitioned between the regulating state and the non-regulating state in response to the main line pressure being less than the threshold pressure level.

The method may also be implemented where the first pressure level is less than the threshold pressure level, the second pressure level is greater than the threshold pressure level, and adjusting regulator control signals causes the main regulator valve to increase the main line pressure from the first pressure level toward the second pressure level. Such a method may also include generating a status signal that indicates the clutch trim valve has transitioned between the regulating state and the non-regulating state in response to the main line pressure being greater than the threshold pressure level.

In accordance with other aspects, the method may include updating a status of a pressure switch of the clutch trim valve in response to the main line pressure being less than the threshold pressure level, and generating a status signal to indicate the status of the pressure switch in response to updating the status of the pressure switch. Some methods may include de-activating a pressure switch of the clutch trim valve in response to the main line pressure being less than the threshold pressure level, and generating a status signal to indicate an inactivate state of the pressure switch in response to de-activating the pressure switch. Other methods may include activating a pressure switch of the clutch trim valve in response to the main line pressure being less than the threshold pressure level, and generating a status signal to indicate an activate state of the pressure switch in response to activating the pressure switch.

According to yet another aspect, the method may be implemented where the first pressure level is greater than the threshold pressure level, the second pressure level is less than the threshold pressure level, and adjusting regulator control signals causes the main regulator valve to reduce the main line pressure from the first pressure level toward the second pressure level. Such a method may further include generating a status signal that indicates the clutch trim valve has transitioned between the regulating state and the non-regulating state in response to the main regulator valve reducing the main line pressure below the threshold pressure level. After generating the status signal, the method may adjust the regulator control signals to cause the main regulator valve to increase the main line pressure from the second pressure level toward the first pressure level, and may generate another status signal that indicates the clutch trim valve has transitioned between the non-regulating state and the regulating state in response to the main regulator valve increasing the main line pressure above the threshold pressure level associated.

According to further aspects, the method may include identifying regulator control signals that are expected to cause the clutch trim valve to transition between the regulating state and the non-regulating state, and generating the one or more calibration parameters based further upon regulator control signals that are expected to cause the clutch trim valve to transition between the regulating state and the non-regulating state. In particular, the method may include generating the one or more calibration parameters based upon a difference between regulator control signals that caused the clutch trim valve to transition between the non-regulating state and the regulating state and regulator control signals that are expected to cause the clutch trim valve to transition between the regulating state and the non-regulating state.

According to yet another aspect, an electro-hydraulic control system for a transmission includes a main regulator valve, a control main valve, a clutch trim valve and an electronic control module. The main regulator modulates a main line pressure of fluid of the electro-hydraulic control system based upon regulator control signals. The control main valve receives fluid at the main line pressure, and develops a control main pressure based upon the main line pressure. The clutch trim valve exerts a clutch feed pressure upon a clutch of the transmission based upon fluid received at the control main pressure, fluid received at the main line pressure, and a clutch control signal. The clutch trim valve also generates status signals that indicate whether the clutch trim valve is in a regulating state. The electronic control module generates regulator control signals, and generates clutch control signals to define a regulation point of the clutch trim valve. The electronic control module also detects via the status signal whether the main line pressure has placed the clutch trim valve in a regulating state, and calibrates regulator control signals based upon regulator control signals that indicate the clutch trim valve transitioned between the regulating and a non-regulating state.

In some aspects, the electronic control module may determine a calibration parameter based upon regulator control signals that caused the clutch trim valve to transition between the regulating and the non-regulating state, and may generate calibrated regulator control signals based upon the calibration parameter. The clutch trim valve may include a pressure switch that generates the status signal based upon fluid pressure applied to the pressure switch. The clutch trim valve may also include a solenoid valve and a pressure regulator valve. The solenoid valve may receive the control main pressure and clutch control signals, and may develop a clutch control pressure based upon the received control main pressure and clutch control signals. The pressure regulator valve may be designed to regulate the main line pressure based upon a threshold pressure level controlled by the clutch control pressure, and may selectively deliver fluid to the pressure switch based upon a predetermined relationship between the main line pressure and the threshold pressure level.

In another aspect, the clutch trim valve includes a solenoid valve, a valve body, and a valve member. The solenoid valve develops a clutch control pressure based upon fluid at the control main pressure and clutch control signals. The valve body has a plurality of ports and an axial bore. The plurality of ports comprising a port to be coupled to fluid at the clutch control pressure, a port to be coupled to fluid at the control main pressure, a port to be coupled to fluid at the main line pressure, and a port coupled to the pressure switch. The valve member is movably positioned in the axial bore of the valve body. The valve member also includes a plurality of lands that selectively couples ports of the plurality of ports based upon position of the valve member in the axial bore. The plurality of ports and the valve member are arranged to deliver fluid at the control main pressure to the pressure switch in response to the main line pressure being less than a threshold pressure level controlled by the clutch control pressure. In such an aspect, the clutch trim valve further include a spring positioned in the axial bore of the valve body to bias the valve member toward an end of the valve body. The spring, the valve body, and the valve member may be arranged to develop the threshold pressure level associated with the regulating state based upon the clutch control pressure.

In accordance with a further aspect, a vehicle includes an engine, a final drive assembly, a transmission, an electro-hydraulic control system, and a fluid supply system. The engine produces torque, the final drive assembly provides locomotion, and the transmission couples torque of the engine to the final drive assembly. The transmission further includes gearsets and clutches that selectively define a speed ratio between the engine and the final drive assembly. The fluid supply system supplies fluid to the electro-hydraulic control system, and the electro-hydraulic control system controls the transmission. The electro-hydraulic control system may include a main regulator valve, a control main valve, a plurality of clutch trim valves, and an electronic control module. The main regulator valve modulates a main line pressure based upon regulator control signals. The control main valve develops a control main pressure based on the main line pressure. Each clutch trim valve develops a clutch feed pressure for a corresponding clutch of the transmission based upon clutch control signals, the main line pressure and the control main pressure. At least one clutch trim valve generates a status signal that indicates whether the clutch trim valve is in a regulating state. The electronic control module generates clutch control signals that adjust the clutch feed pressure of associated clutch trim valves, detects via the status signal whether the at least one a clutch trim valve is in the regulating state, and calibrates regulator control signals in response to status signals that indicate that the clutch trim valve has transitioned to a non-regulating state.

The clutch trim valve may include a pressure switch, a valve body, and a valve member. The pressure switch activates the status signal in response to receiving fluid at the control main pressure. The valve body includes a port coupled to fluid at the control main pressure, a port to deliver fluid at the clutch feed pressure, and a port coupled to the pressure switch. The valve member is positioned in a bore of the valve body to deliver fluid at the control main pressure to the pressure switch in response to the main line pressure being less than a threshold pressure level, and the electronic control module determines that clutch has transitioned to the non-regulating state based upon the status signal. The electronic control module may further determine a calibration parameter for regulator control signals based upon regulator control signals associated with the clutch trim valve transitioning to the non-regulating state.

BRIEF DESCRIPTION OF THE DRAWINGS

Embodiments described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. Furthermore, some reference labels may include a superscript and/or subscript to identify a particular item of a group of corresponding or analogous items; but such superscripts and/or subscripts may be omitted to refer to the group of items or a non-specific item of the group.

DETAILED DESCRIPTION

Figure 1:
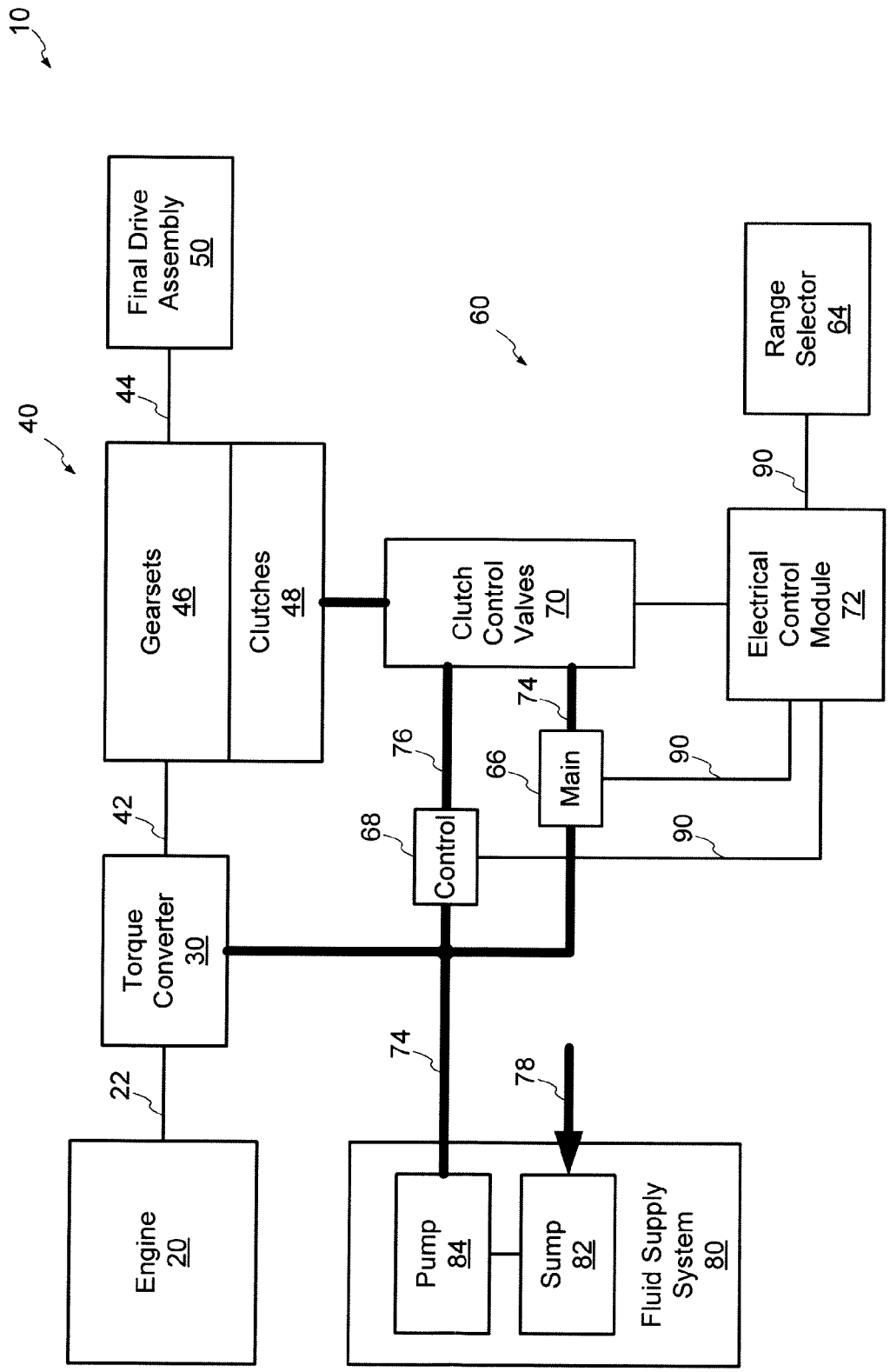
FIG. 1 shows an embodiment of a vehicle having a power train and a electro-hydraulic control system to selectively engage clutches of the power train.

Aspects of specific embodiments are presented by way of example in the drawings and described in detail. However, such aspects are susceptible to various modifications and alternative forms. Accordingly, the particular forms disclosed are not intended to be limiting, but on the contrary, the intention is to cover all modifications, equivalents, and alternatives falling within the spirit and scope of the invention as defined by the appended claims.

Specific details regarding aspects of illustrative embodiments are set forth in order to provide a more thorough understanding. However, some embodiments may practice such aspects without such specific details. In other instances, certain aspects have not been shown in detail in order not to obscure other aspects of the illustrative embodiments.

References in the specification to "one embodiment", "an embodiment", "an illustrative embodiment", etc., indicate that the embodiment described may include a particular feature, structure, or characteristic; however, other embodiments may not necessarily include the particular feature, structure, or characteristic. Moreover, such phrases are not necessarily referring to the same embodiment. When a particular feature, structure, or characteristic is described in connection with an embodiment, other illustrative embodiments may also include such a particular feature, structure, or characteristic whether or not explicitly described.

Embodiments may be implemented in hardware, firmware, software, or any combination thereof. Embodiments may also be implemented as instructions stored on a machine-readable medium, which may be read and executed by one or more processors. A machine-readable medium may include any mechanism for storing information in a form readable by a machine (e.g., a computing device). For example, a machine-readable medium may include read only memory (ROM); random access memory (RAM); magnetic disk storage media; optical storage media; flash memory devices; and others.

Details of the present invention may be described herein with reference to either normally high solenoids or normally low solenoids. A normally high solenoid develops or permits a high output pressure in response to receiving no electrical control signal or an electrical control signal having a low duty cycle. A normally high solenoid conversely develops a lower output pressure or prevents development of a high output pressure in response to receiving an electrical control signal or an electrical control signal with a high duty cycle. In contrast, a normally low solenoid develops or permits a high output pressure in response to receiving an electrical control signal or an electrical control signal with a high duty cycle. A normally low solenoid further develops a lower output pressure or prevents development of a high output pressure in response to receiving no electrical control signal or an electrical control signal having a low duty cycle. The following illustrated embodiments use normally low solenoids. However, one of ordinary skill in the art may readily replace one or more of the normally low solenoids of the illustrated embodiments with normally high solenoids and modify other aspects of the illustrated embodiments to account for the replacement.

Referring now to FIG. 1, a power train 10 of a vehicle is shown. The power train 10 includes an engine 20, a torque converter 30, a transmission 40, a final drive assembly 50, an electro-hydraulic control system 60, and a fluid supply system 80. The engine 20 may include a spark-ignited engine, a diesel engine, an electric hybrid engine (e.g. a combustion engine powering an electric generator that powers an electric engine), or the like. As shown, an output 22 of the engine 20 is coupled to the torque converter 30, and the torque converter 30 is coupled to an input shaft 42 of the transmission 40. The torque converter 30 generally receives torque from the engine output 22 and fluidically transfers the received torque to the transmission input shaft 42, thus permitting the rotation of the engine output 22 to differ from the rotation of the transmission input shaft 42. In some embodiments, the torque converter 30 may mechanically lock the engine output 22 to the transmission input shaft 42 once the input shaft 42 achieves a rotation rate similar to the rotation rate of the engine output 22.

As further shown, an output shaft 44 of the transmission 40 is coupled to the final drive assembly 50 that provides the vehicle with locomotion. The final drive assembly 50 may include wheels, continuous tracks, turbines, and/or other drive equipment. Further, the final drive assembly 50 may further include a transfer case to selectively deliver torque received via the transmission output shaft 44 to such wheels, continuous tracks, and/or other engine driven equipment. For example, the transfer case may selectively transfer torque to front wheels, back wheels, or all wheels of the vehicle.

The transmission 40 also includes gearsets 46 and clutches 48. The gearsets 46 and clutches 48 cooperate to provide a plurality of selectable speed ratios and output ranges between the input shaft 42 and the output shaft 44. For example, the gearsets 46 and clutches 48 may provide neutral ratios, multiple reverse speed ratios, and/or multiple forward speed ratios. In one embodiment, the transmission 40 includes three interconnected planetary gearsets 46 and five clutches 48 that are controllable to provide six forward speed ratios or "gears". Other configurations of gearsets 46 and clutches 48 are also possible.

The electro-hydraulic control system 60 controls operation of the transmission 40 and in particular the selected speed ratio between the input shaft 42 and the output shaft 44. As shown, the control system 60 includes a range selector 64, a main regulator valve 66, a control main valve 68, and several clutch trim valves 70. The control system 60 further includes an electronic control module (ECM) 72 to control and monitor the fluid supply system 80, the range selector 64, the main regulator valve 66, the control main valve 68, and the clutch trim valves 70.

The fluid supply system 80 is fluidically coupled to torque converter 30, the main regulator valve 66, the control main valve 68, and the clutch trim valves 70 via main lines or conduits 74. Further, the control main valve 68 is coupled to the clutch trim valves 70 via control lines or conduits 76.

The fluid supply system 80 includes a sump 82 coupled to various exhaust lines or conduits 78 in order to receive fluid collected from components of the power train 10 such as torque converter 30, transmission 40, clutches 48, and valves 66, 68, 70. The fluid supply system 80 includes an engine driven pump 84 coupled to main lines 74 to pump fluid from the sump 82 to components of the power train 10 such as the torque converter 30, transmission 40, clutches 48 and valves 66, 68, 70. As discussed in more detail below, the main regulator valve 66 and the clutch trim valves 70 are controlled by solenoids, such as variable bleed solenoids, on/off solenoids, or similar devices that regulate fluid pressure developed by the main regulator valve 66 and clutch trim valves 70.

As mentioned above, the ECM 72 controls and monitors various components of the power train 10. To this end, the ECM 72 is coupled to components of the power train 10 via one more links 90 such as wires, CAN networks and the like. Only a few illustrative links 90 are shown in FIG. 1 so as not to obscure other aspects of the illustrative embodiment. Via links 90, the ECM 72 provides components of the power train 10 with control signals to control their operation and may receive data or status signals from components of the power train 10 that provide information regarding their operation. For example, the ECM 72 may control operation of the transmission 40 based on status signals received from the engine 20, the torque converter 30, the transmission 40, the range selector 64, and/or other components. Such status signals may include electrical and/or analog signals received from sensors, controls or other like devices associated with the vehicle components. For instance, status signals may include signals indicative of transmission input speed, driver requested torque, engine output torque, engine speed, temperature of the hydraulic fluid, transmission output speed, turbine speed, brake position, gear ratio, torque converter slip, and/or other measurable parameters.

The ECM 72 may include computer circuitry such as one or more microprocessors and related elements configured to process executable instructions expressed in computer programming code or logic stored in one or more tangible computer readable media. The ECM 72 may also include analog to digital converters and/or other signal processing circuitry or devices to process one or more of the status signals received from the vehicle components. While shown in FIG. 1 as a single block, ECM 72 may be implemented as separate logical and/or physical structures. For example, the ECM 72 may be physically and/or logically separated from electronic controls for the transmission 40 or electronic controls for the engine 20. All or portions of the ECM 72 may alternatively or in addition be executed by a controller that is not on-board the vehicle, such as an external controller located at a transmission manufacturer or an assembly location.

As mentioned above the valves 66, 68, 70 regulate fluid pressure supplied to various components of the power train 10. In particular, the main regulator valve 66 generates an adjustable main line pressure MP, and the control main valve 68 develops a control main pressure CP in response to receiving fluid at the main line pressure MP. Moreover, each clutch trim valve 70 generates a clutch feed pressure CF for a respective clutch 48 based upon clutch control signals, the main line pressure MP, and the control main pressure CP.

The main regulator valve 66 may support a range (e.g. about 50-about 300 psi) of main line pressures MP. The ECM 72 may generate regulator control signals that cause the main regulator valve 66 to adjust the main line pressure MP to a desired main line pressure (e.g. about 200 psi). The main line pressure MP developed by the main regulator valve 66 is routed to various components via main lines 74 and may be used to hydraulically actuate components such as clutches 48. The control main valve 68 develops and supplies an intermediate control main pressure CP (e.g. about 50-about 100 psi) in response to receiving the main line pressure MP. Control lines 76 may provide fluid at the control main pressure CP to control various components of the hydraulic control system 60. In particular, solenoids of the main regulator valve 66 and clutch trim valves 70 may receive fluid at the control main pressure CP and such solenoids may use the control main pressure CP to adjust the pressures developed by the main regulator valve 66 and clutch trim valves 70. Each clutch trim valve 70 may support a range of clutch feed pressures CF (e.g. about 0-about 300 psi). The ECM 72 may generate clutch control signals that cause each clutch trim valve 70 to adjust its clutch feed pressure CF to a desired clutch feed pressure CF. By varying the clutch control signals, the ECM 72 may fully engage, disengage and/or partially engage/disengage a clutch 48 of the transmission 40.

As mentioned above, the ECM 72 controls operation of the main regulator valve 66 via regulator control signals. In particular, the ECM 72 generates regulator control signals based upon shift requests, transmission temperature, solenoid specifications, and potentially other parameters. The relationship between regulator control signals and main line pressure MP is generally initially set according to specifications provided by the supplier or manufacturer of the main regulator valve 66. In particular, supplier specifications typically provide P/I curves, charts, or tables that relate the main line pressure MP developed by the main regulator valve 66 to the regulator control signals received by the main regulator valve 66. Thus, based upon such P/I curves, charts, or tables, the ECM 72 may generate regulator control signals to develop the main line pressure MP at a desired pressure level.

The ECM 72 may modulate or adjust the pressure level of the main line pressure MP for various reasons. For example, the ECM 72 may modulate the main line pressure MP to increase fluid flow through a cooler (not shown) during idle. The ECM 72 may also modulate the main line pressure MP to increase fuel economy of the vehicle. For example, the ECM 72 may lower the main line pressure MP to a level just above what is required to maintain clutch capacity in order to reduce fuel consumption. However, in such an embodiment, if the actually developed main line pressure MP is lower than the main line pressure MP expected by the ECM 72, then the lower main line pressure MP may result in clutch slippage.

Figure 2:
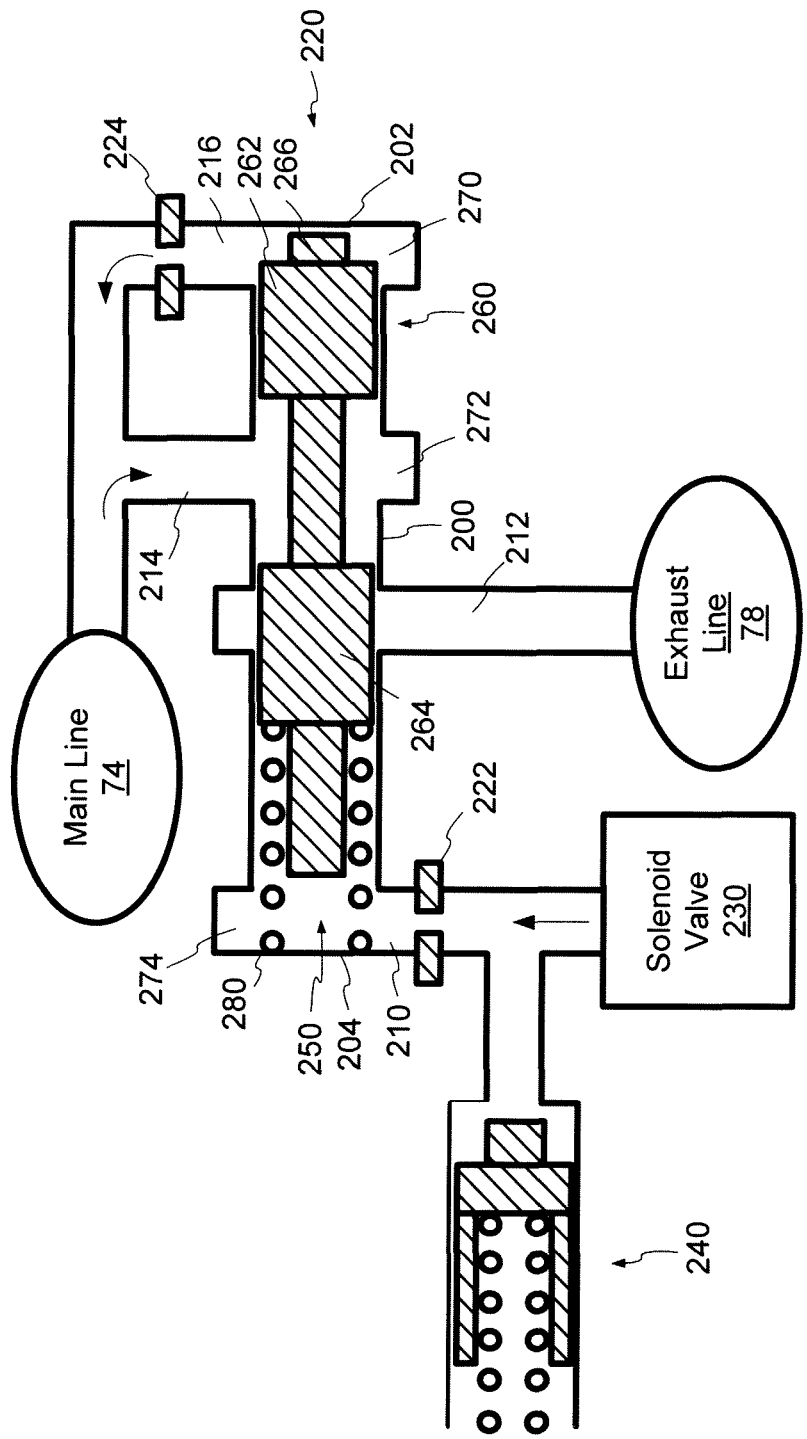
FIG. 2 shows an embodiment of a main regulator valve of the electro-hydraulic control system of FIG. 1.

Various sources may contribute to the pressure level of main line pressure MP being lower than the pressure level that is expected by the ECM 72. For example, the input current to output pressure characteristics of a particular solenoid may vary from the expected input current to output pressure characteristics. As shown in FIG. 2, the main regulator valve 66 may include a pressure regulator valve 220, a solenoid valve 230, and an accumulator 240. As explained in further detail below, the main line pressure MP regulated by the main regulator valve 66 depends upon a solenoid pressure developed by the solenoid valve 230. While the manufacture typically supplies P/I curves that relate input current to the solenoid pressure developed by the solenoid valve 230, actual performance of the solenoid valve 230 typically varies from the supplied P/I curves. Thus, variance of the solenoid valve 230 from the supplied P/I curves introduces variation between the regulator control signals supplied to the solenoid valve 230 and the pressure level expected to be developed in response to such regulator control signals.

The ECM 72 includes output drivers that generate control signals such as regulator control signals supplied to the solenoid valve 230 of the main regulator valve 66. Such output drivers may produce control signals having characteristics (e.g. current level) that vary from expected characteristics (e.g. current level) of the control signals. For example, the output current of a particular driver may produce a regulator control signal having a current level that differs from the current level expected to be produced. Moreover, the magnitude of such variances may differ between output drivers of the ECM 72. The main line pressure MP developed by the main regulator valve 66 is further dependent upon a spring 280 of the pressure regulator valve 220. Thus, variations in the force of the spring 280 and/or variations in the length of the spring 280 may further cause the developed main line pressure MP to vary from the expected main line pressure MP.

Thus, the ECM 72 may generate regulator control signals that the ECM 72 expects will cause the main regulator valve 66 to develop the main line pressure MP at a desired pressure level. However, due to the above discussed causes of variance, the main regulator valve 66 may develop the main line pressure MP at a pressure level that is different than the desired pressure level. In order to account for such variances between a particular pressure level that the ECM 72 expects the main regulator valve 66 to develop in response to particular regulator control signals and an actual pressure level developed by the main regulator valve in response to the particular regulator control signals, the ECM 72 in one embodiment calibrates the main regulator valve 66 by adjusting or "fine-tuning" the regulator control signals generated by the ECM 72. In particular, the ECM 72 calibrates the regulator control signals such that the main line pressure MP developed by the main regulator valve 66 in response to the regulator control signals more closely aligns with the main line pressure MP that the ECM 72 expects the main regulator valve 66 to develop in response to the regulator control signals.

Referring now to FIG. 2, further details regarding one embodiment of the main regulator valve 66 are presented. As shown, the main regulator valve 66 includes a pressure regulator valve 220, a solenoid valve 230 and an accumulator 240. The pressure regulator valve 220 includes a valve body 200 having a solenoid port 210, an overage port 212, a main line port 214, and a feedback port 216. The solenoid port 210 is coupled to the solenoid valve 230 and to the accumulator 240 via a restrictor 222. The overage port 212 may be coupled to exhaust lines 78 to return overage or fluid exhausted from the main regulator valve 66 to the sump 82 of the fluid supply system 80. The main line port 214 may be coupled to the fluid supply system 80 via main line 74. Likewise, the feedback port 216 may be coupled to the fluid supply system 80 via main line 74 and restrictor 224.

The valve body 200 further includes an axial valve bore 250 that fluidically couples the ports 210, 212, 214, and 216. The pressure regulator valve 220 further includes a valve member 260 positioned in axial bore 250 of the valve body 200. The valve member 260 includes an upper land 262 and a lower land 264 that effectively divide the valve bore 250 into an upper chamber 270 between the upper land 262 and an upper end 202 of the valve body 200, a middle chamber 272 between the lands 262, 264, and a lower chamber 274 between the lower land 264 and a lower end 204 of the valve body 200.

The valve member 260 is slideably moveable along the axial valve bore 250. In particular, a spring 280 positioned in the lower chamber 274 between the lower end 204 of the valve body 200 and the lower land 264 biases the valve member 260 toward the upper end 202 of the valve body 200 until a seat 266 of the valve member 260 rests against the upper end 202 of the valve body 200. A solenoid pressure supplied to the lower chamber 274 by the solenoid valve 230 biases the valve member 260 toward the upper end 202. Conversely, main line pressure MP supplied to the upper chamber 270 via feedback port 216 biases the valve member 260 toward the lower end 204 of the valve body 200. Thus, the valve member 260 moves toward the upper end 202 if the spring 280 and solenoid valve 230 exert a greater force upon the valve member 260 than the force exerted upon the valve member 260 by the main line pressure MP. Conversely, the valve member 260 moves toward the lower end 204 if the spring 280 and solenoid valve 230 exert a lesser force upon the valve member 260 than the force exerted upon the valve member 260 by the main line pressure MP.

As shown in FIG. 2, when the valve member 260 is positioned toward the upper end 202, the land 264 decouples the overage port 212 from the middle chamber 272. In such a position, the main line pressure MP created by the fluid supply system 80 is applied to the land 262 via the middle chamber 272. However, when the valve member 260 is moved toward the lower end 204, the land 264 moves past the overage port 212 thus venting the middle chamber 272 to the exhaust lines 78. Venting the middle chamber 272 to the exhaust lines 78 reduces the pressure in the middle chamber 272 and therefore reduces the main line pressure MP applied to the land 262. Venting of the middle chamber 272 occurs whenever the main line pressure is sufficient to overcome the biasing forces of spring 280 and the solenoid output pressure of valve 230. Accordingly, by controlling the fluid pressure in the lower chamber 274, the ECM 72 may regulate the main line pressure MP. To this end, the ECM 72 in one embodiment provides the solenoid valve 230 with regulator control signals that result in the solenoid valve 230 modulating the solenoid output pressure applied to the lower chamber 274 and thereby adjusting the position of the valve member 260 in the bore 250. Thus, the ECM 72 may modulate the main line pressure MP by causing the solenoid valve 230 to selectively connect the main line port 214 to the exhaust line 78.

Figure 3:
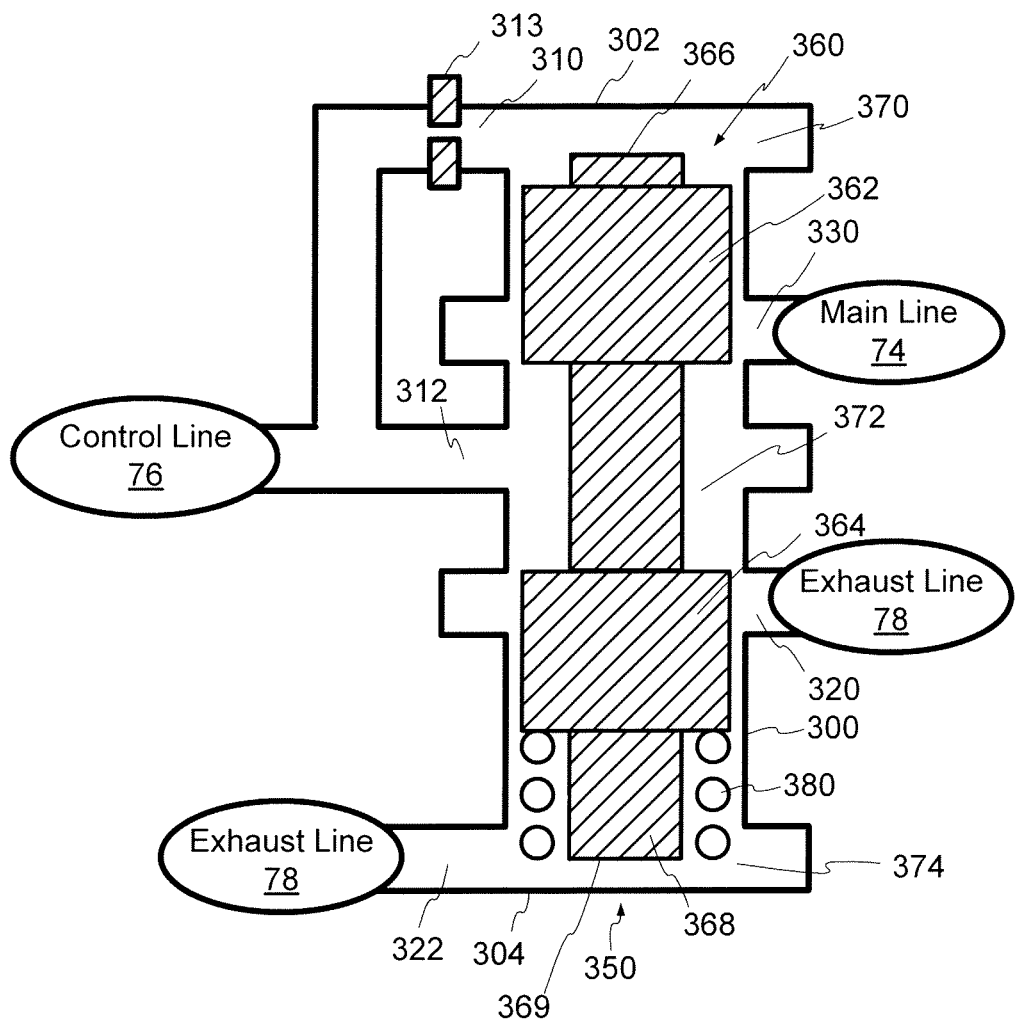
FIG. 3 shows an embodiment of a control main valve of the electro-hydraulic control system of FIG. 1 in a regulating position.
Figure 7:
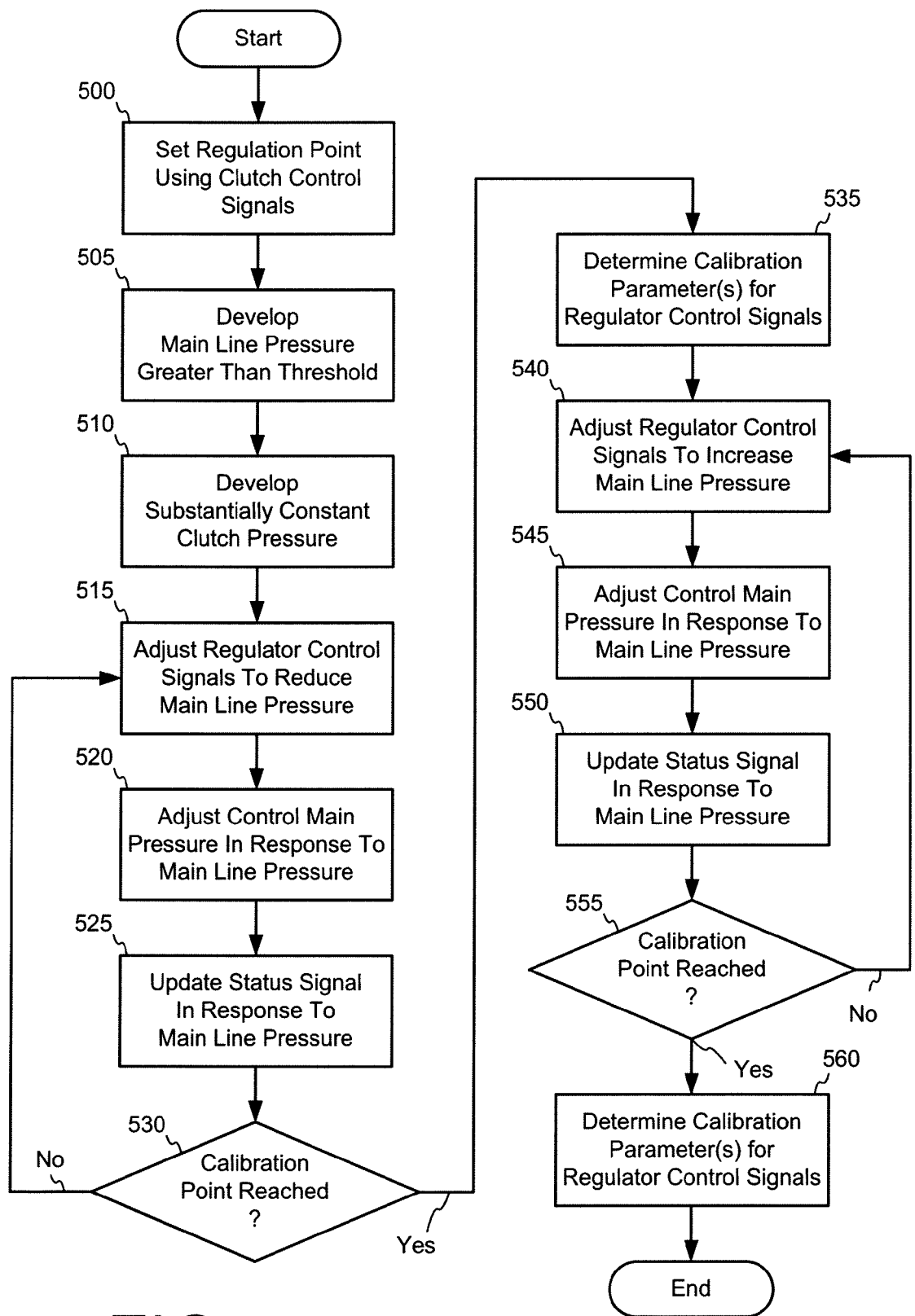
FIG. 7 shows a flowchart for an embodiment of main modulation calibration method implemented by the electro-hydraulic control system of FIG. 1.

In order to better understand the main modulation method of FIG. 7, details regarding an illustrative embodiment of the control main valve 68 are presented in FIG. 3. As shown in FIG. 3, the control main valve 68 includes a valve body 300 having a feedback port 310 and a control port 312. The valve body 300 includes an upper exhaust port 320 and a lower exhaust port 322. The valve body 300 further includes a main port 330. In one embodiment, a control line 76 of the electro-hydraulic control system 60 is coupled to the feedback port 310 via a restrictor 313. The control line 76 is also coupled to the control port 312 of the valve body 300. The main line 74 is coupled to the main port 330, and the exhaust lines 78 are coupled to the exhaust ports 320, 322.

The valve body 300 further includes an axial valve bore 350 that longitudinally traverses the valve body 300. The valve bore 350 fluidically couples the ports 310, 312, 320, 322, 330 and 332. The control main valve 68 further includes a valve member 360 positioned in axial bore 350 of the valve body 300. The valve member 360 includes an upper land 362 and a lower land 364 that effectively divide the valve bore 350 into an upper chamber 370 between the upper land 362 and an upper end 302 of the valve body 300, a middle chamber 372 between the upper land 362 and the lower land 364, and a lower chamber 374 between the lower land 364 and a lower end 304 of the valve body 300. Further, the valve member 360 is slideably moveable along the axial valve bore 350. In particular, a spring 380 positioned in the lower chamber 374 between the lower end 304 of the valve body 300 and the lower land 364 biases the valve member 360 toward the upper end 302 of the valve body 300 until a seat 366 of the valve member 360 rests against the upper end 302 of the valve body 300.

The control main valve 68 has a non-regulating state (not shown) where the valve member 360 is fully stroked, i.e., positioned in the bore 350 such that the stem 369 of the valve member 360 rests against the lower end 304 of the body 300. The control main valve 68 has another non-regulating state (not shown) where the valve member 360 is fully destroked, i.e., positioned in the bore 350 such that the seat 366 rests against the upper end 302 of the valve body 300. The control main valve 68 also has a regulating state as depicted in FIG. 3, in which the valve member 360 is positioned in the bore 350 such that the valve member 360 does not rest against either the upper end 302 or the lower end 304 of the body 300. Thus, in one embodiment, the control main valve 68 has a regulating state and two non-regulating states (e.g. a stroked state and a de-stroked state).

The control main valve 68 develops a control main pressure CP at a pressure level that is dependent upon the main line pressure MP supplied to the main line port 330. When no fluid is supplied to the control main pressure CP via the main line port 74, the spring 380 biases the valve member 360 toward the upper end 302, thus placing the control main valve 68 in the de-stroked non-regulating state. In the de-stroked state, the valve member 360 fluidically couples the main line 74 to the control line 76 via the middle chamber 372 while blocking the exhaust ports 320, 322. Accordingly, as fluid is introduced to the middle chamber 372 via the main line port 330, the valve member 360 directs the fluid to the control port 312 which further directs fluid toward the upper chamber 370 via the feedback port 310.

As the main line pressure MP is increased, the increased fluid pressure in the upper chamber 370 applies a downward force upon the valve member 360. Eventually, the pressure in the upper chamber 370 exerts a downward force upon the valve member 360 that is greater than the upward force of the spring 380. As a result of such force, the valve member 360 moves toward the lower end 304 of the valve body 300. As shown in FIG. 3, downward movement of the valve member 360 eventually decouples the main line port 330 from the middle chamber 372. Continual downward movement of the valve member 360 further couples the middle chamber 372 to exhaust port 320, thus exhausting fluid from the middle chamber 372 and reducing the fluid pressure in the middle chamber 372.

As a result of the above arrangement of ports, valve member 360 and spring 380, the control main valve maintains or regulates the control main pressure CP at a substantially constant pressure level once the main line pressure MP is greater than a threshold pressure level (e.g. about 100 psi). Above such threshold pressure level, the main line pressure MP places the control main valve 68 in the regulating state. In the regulating state, the valve member 360 selectively vents the middle chamber 372 to the exhaust lines 78 to maintain the control main pressure CP at a predetermined pressure level (e.g. 100 psi). As the main line pressure increases, the control main valve 68 vents the upper chamber 372 to the exhaust lines 78 more frequently and as the main line pressure decreases, the control main valve 68 vents the middle chamber 372 to the exhaust lines 78 less frequently.

Figure 4:
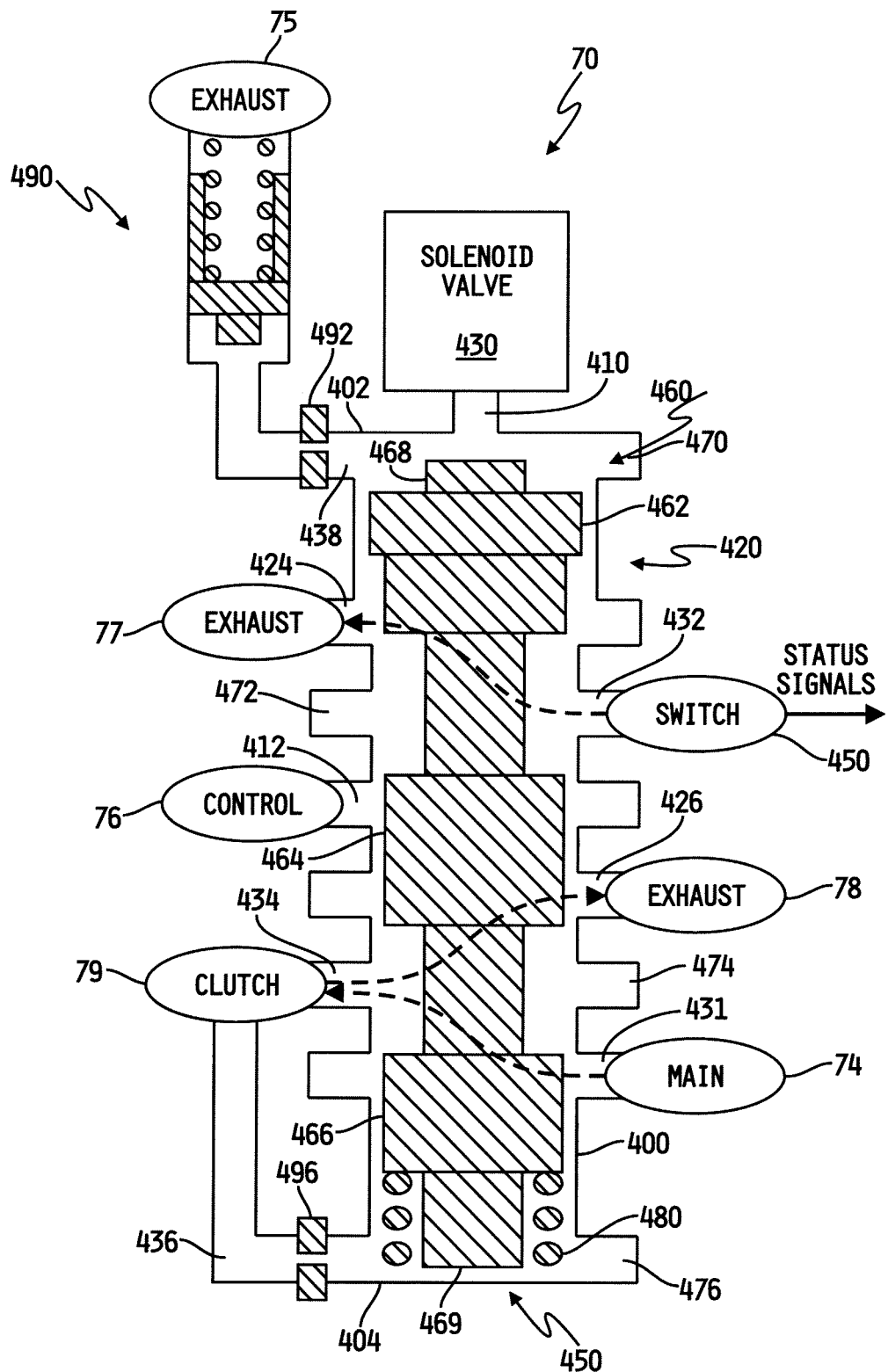
FIG. 4 shows an embodiment of a clutch trim valve of the electro-hydraulic control system of FIG. 1 in a regulating position.
Figure 5:
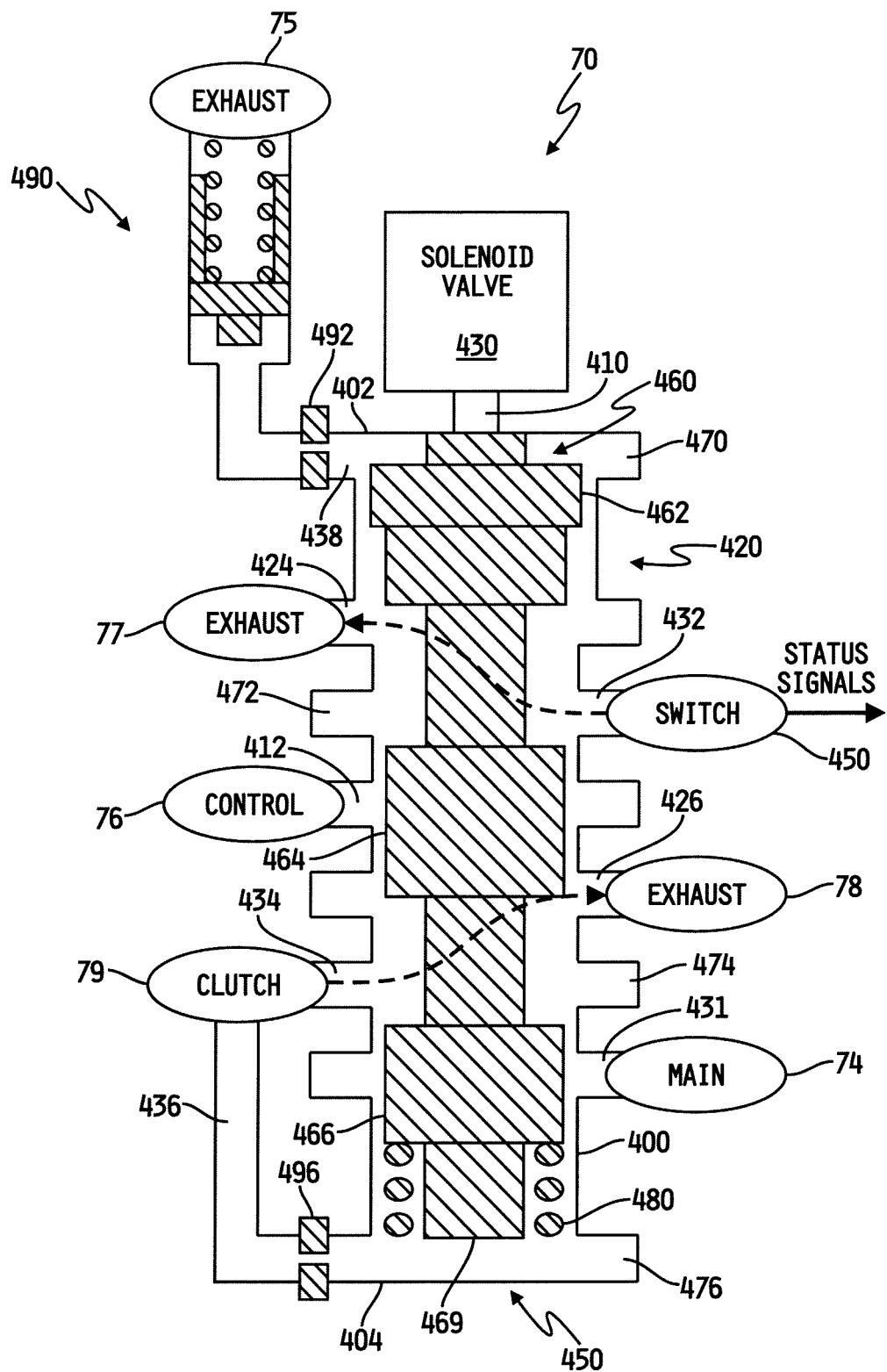
FIG. 5 shows the clutch trim valve of FIG. 4 in a non-regulating position.
Figure 6:
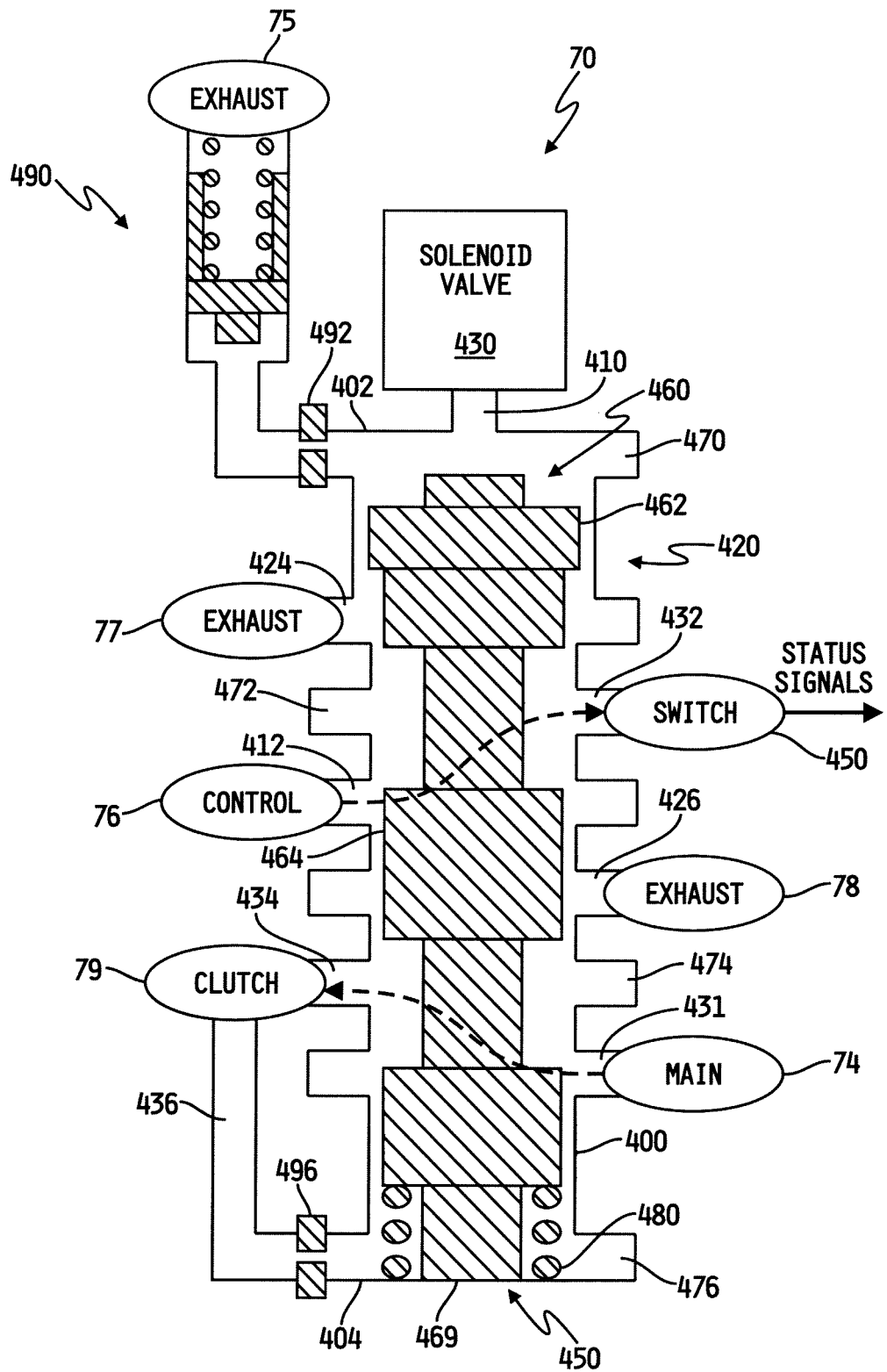
FIG. 6 shows the clutch trim valve of FIG. 4 in another non-regulating position.

An embodiment of one of the clutch trim valves 70 is shown in FIGS. 4, 5, and 6. The clutch trim valve 70 is part of the clutch control valve assembly 70 of the electro-hydraulic control system 60. The clutch trim valve 70 includes a pressure regulator valve 420, a solenoid valve 430 and an accumulator 490. The pressure regulator valve 420 includes a valve body 400 having a solenoid port 410, a control port 412, exhaust ports 424, 426, a main port 431, a switch port 432, a clutch feed port 434, and a clutch feedback port 436. The solenoid port 410 is in fluid communication with the solenoid valve 430. The solenoid port 410 is also in fluid communication with the accumulator 490 via an accumulator port 438 and a restrictor 492. A control passage 76 is coupled to the control port 412. Exhaust passages 77, 78 are coupled to the exhaust ports 424, 426, respectively. A main passage 74 is coupled to the main port 431, and a clutch passage 79 is coupled to a lower middle chamber 474 of the pressure regulator valve 420 via the clutch feed port 434. The clutch passage 79 is further coupled to a lower chamber 476 of the pressure regulator valve 420 via the clutch feedback port 436 and a restrictor 496.

The pressure regulator valve 420 has a valve member 460 that is axially translatable in a valve bore of the valve body 400. The ports 410, 412, 414, 422, 424, 426, 430, 432, 434, 436, and 438 are in fluid communication with the valve bore 450. The valve member 460 includes an upper land 462, a middle land 464, and a lower land 466 that effectively divide the valve bore 450 into an upper chamber 470 between the upper land 462 and an upper end 402 of the valve bore 450, an upper middle chamber 472 between the upper land 462 and middle land 464, a lower middle chamber 474 between the middle land 464 and the lower land 466, and a lower chamber 476 between the lower land 466 and a lower end 404 of the valve bore 450.

A spring 480 is positioned in the lower chamber 476 between the lower end 404 of the valve bore 450 and the lower land 466. The spring 480 biases the valve member 460 toward the upper end 402 of the valve bore 450 until a seat 468 of the valve member 460 rests against the upper end 402 of the valve body 400 as shown in FIG. 5. A clutch control pressure supplied to the upper chamber 470 by the solenoid valve 430 biases the valve member 260 toward the lower end 404 as shown in FIG. 6. Conversely, main line pressure MP supplied to the lower middle chamber 474 via main line port 431 biases the valve member 460 toward the upper end 402 of the valve bore 450. Thus, the valve member 460 moves toward the upper end 402 if the spring 480 and fluid pressure in the main passage 74 exert a greater force upon the valve member 460 than the force exerted upon the valve member 460 by the clutch control pressure. Conversely, the valve member 260 moves toward the lower end 404 if the spring 480 and fluid pressure in the main passage 74 exert a lesser force upon the valve member 460 than the force exerted upon the valve member 460 by the clutch control pressure.

When the valve member 460 is destroked, i.e., positioned toward the upper end 402 as shown in FIG. 5, the lower land 466 decouples the main port 431 from the lower middle chamber 474. The position of middle land 464 couples the exhaust port 426 to the lower middle chamber 474. In such a position, the valve member 460 vents the clutch passage 79 to the exhaust passage 78 via the lower middle chamber 474, thus reducing the fluid pressure in the lower middle chamber 474 and the clutch feed pressure CF in the clutch passage 79.

When the valve member 460 is stroked, i.e., moved toward the lower end 404 as shown in FIG. 6, the position of the middle land 464 decouples the lower middle chamber 474 from the exhaust port 424 and the position of the lower land 466 exposes the lower middle chamber 474 to the main port 431, thus raising the pressure level of the lower middle chamber 474 and the clutch feed pressure CF in the clutch passage 79. Accordingly, by controlling the position of the valve member 460 of the clutch trim valve 70, the ECM 72 may regulate or otherwise control the clutch feed pressure CF developed by the clutch trim valve 70. To this end, the ECM 72 in one embodiment provides the solenoid valve 430 with clutch control signals that result in the solenoid valve 430 modulating the clutch control pressure applied to the upper chamber 470 and thereby adjusting the position of the valve member 460 in the bore 450. Thus, the ECM 72 may modulate the clutch feed pressure CF by causing the solenoid valve 430 to selectively exhaust the lower middle chamber 474 to the exhaust line 78. FIG. 4 shows the clutch trim valve in such a modulating or regulating state.

In summary, the clutch trim valve 70 may be in a de-stroked non-regulating state where the valve member 460 is positioned in the bore 450 such that the seat 468 rests against the upper end 402 of the valve body 400. The clutch trim valve 70 may conversely be in a stroked non-regulating state where the valve member 460 is positioned in the bore 450 such that the stem 469 of the valve member 460 rests against the lower end 404 of the valve body 400. The clutch trim valve 70 may further be placed into a regulating state as depicted in FIG. 4 in which the valve member 460 is positioned in the bore 450 such that no portion of the valve member 460 rests against either the upper end 402 or the lower end 404 of the body 400. Thus, in one embodiment, the clutch trim valve 70 has a regulating state and two non-regulating states (e.g. a stroked state and a de-stroked state).

In the destroked non-regulating state of FIG. 5, land 466 blocks fluid at the main pressure from flowing into the clutch passage 79 and land 464 blocks control pressure from flowing to the pressure switch 450. Clutch passage 79 and pressure switch 450 are in fluid communication with exhaust passages 78, 77, respectively. Accordingly, as fluid exits the pressure switch 450 via upper middle chamber 472, the pressure switch 450 is depressurized. When the pressure switch 450 is fully depressurized, the pressure switch 450 changes state (i.e., it either begins issuing or ceases issuing an electrical signal to ECM 72, depending upon the configuration of the switch).

When the valve 420 is in the stroked non-regulating state of FIG. 6, fluid at the control pressure flows to the pressure switch 450 via the upper chamber 472, and pressurizes the pressure switch 450. When the pressure switch 450 is fully pressurized, it changes state again (i.e., it ceases issuing or begins issuing an electrical signal to the ECM 72, depending on the configuration of the switch).

Assuming a constant main line pressure MP, as the solenoid valve 430 increases the clutch control pressure applied to the upper chamber 470, the increased fluid pressure in the upper chamber 470 applies a downward force upon the valve member 460. Eventually, the pressure in the upper chamber 470 exerts a downward force upon the valve member 460 that is greater than the upward force of the spring 480. As a result of such force, the valve member 460 moves toward the lower end 404 of the valve body 400. Downward movement of the valve member 460 eventually couples the control line 76 and the pressure switch, causing the pressure switch 450 to change state as described above. Downward movement of the valve member 460 decouples the lower middle chamber 474 from the exhaust port 426 and to the main line 74, thus increasing the pressure level in the lower middle chamber 474.

The increased pressure in the lower middle chamber 474 provides an upward force upon the valve member 460. Such increased pressure causes the valve member 460 to translate upward thereby venting the lower middle chamber 474 to the exhaust passage 78 via port 426. As a result of the above arrangement of ports, valve member 460 and spring 480, the clutch control valve 70 maintains or regulates the clutch feed pressure CF at a substantially constant pressure level for a given clutch control signal when the main line pressure MP is greater than a threshold pressure level (e.g. about 130 psi). Above such threshold pressure level, the main line pressure MP places the clutch trim valve 70 in the regulating state of FIG. 4.

When the pressure regulator valve 420 transitions from the fully stroked non-regulating state to the regulating state, the land 464 decouples the upper middle chamber 472 from the control passage 76, thereby depressurizing the pressure switch 450. As a result, the pressure switch 450 changes state (i.e., it either begins issuing or ceases issuing an electrical signal to the ECM 72, depending on the configuration of the switch). Thus, the pressure switch 450 changes state each time the valve 420 changes from the regulating state to the fully stroked non-regulating state or vice versa.

While in the regulating state, the valve member 460 dithers, thereby selectively venting the lower middle chamber 474 to the exhaust lines 78 to maintain the clutch feed pressure CF at a predetermined pressure level (e.g. about 130 psi). As the main line pressure increases, the clutch trim valve 70 vents the lower middle chamber 474 to the exhaust line 78 more frequently and as the main line pressure MP decreases, the clutch trim valve 70 vents the lower middle chamber 474 to the exhaust line 78 less frequently.

Figure 8:
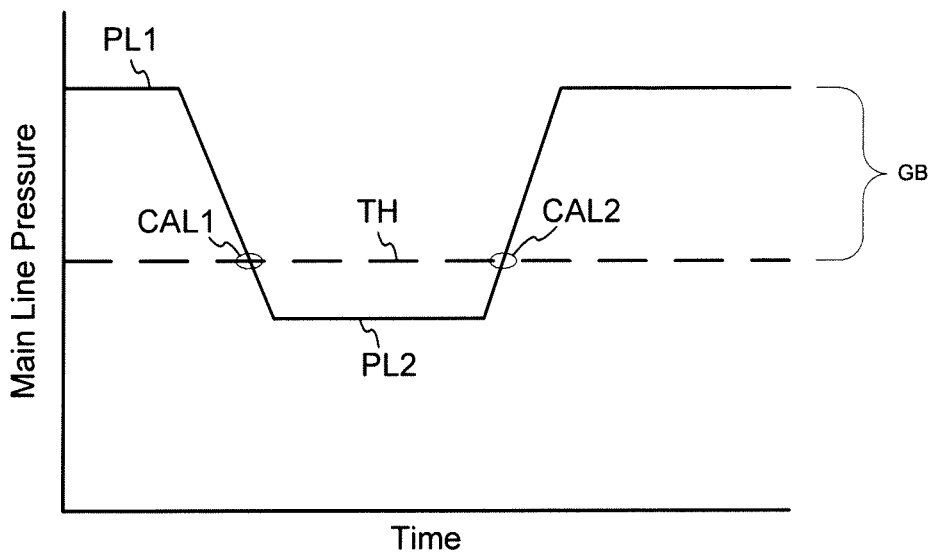
FIG. 8 shows a graph of main line pressure in response to the main modulation calibration method of FIG. 5.
Figure 9:
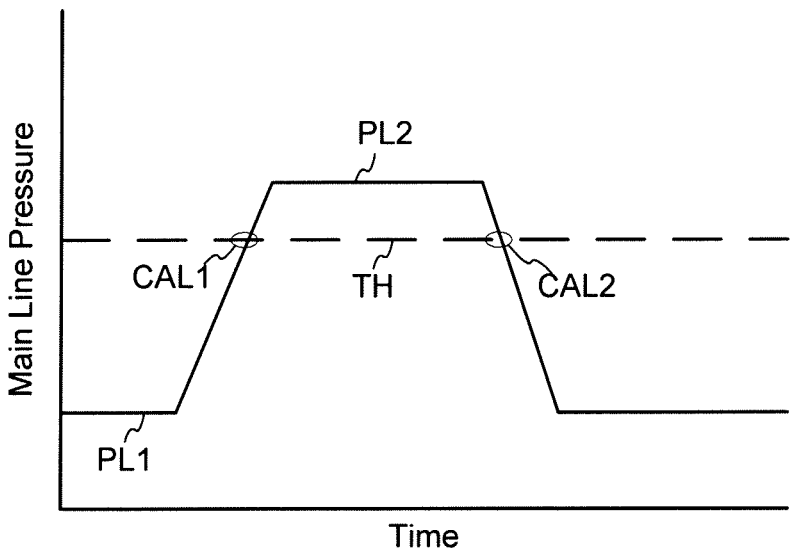
FIG. 9 shows a graph of main line pressure in response to another embodiment of a main modulation calibration method.
Figure 10:
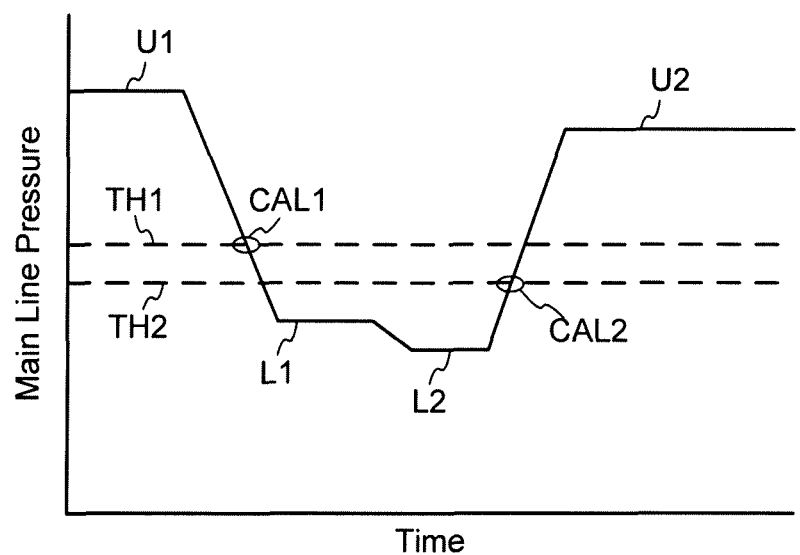
FIG. 10 shows a graph of main line pressure in response to yet another embodiment of a main modulation calibration method.

Referring now to FIGS. 7 and 8-10, a main modulation calibration method will be described. In particular, FIG. 7 shows a flowchart of one embodiment of a main modulation method and FIGS. 8-10 show graphs of the main line pressure MP in response to the main modulation method of FIG. 7. As shown in FIG. 7, the ECM 72 in block 500 may set a regulation point of a clutch trim valve 70 via clutch control signals. As explained above, the control main valve 68 develops a substantially constant control main pressure CP assuming sufficient main line pressure MP (e.g. about 100 psi). The solenoid valve 430 receives the control main pressure CP and develops a clutch control pressure that is dependent upon the control main pressure CP and clutch control signals. Assuming the solenoid valve 430 applies a clutch control pressure to the upper chamber 470 that is sufficient to overcome the upward force of the spring 480, the clutch control pressure defines a threshold pressure level TH for the clutch trim valve 70. In particular, the clutch enters a regulation state if the main line pressure MP is greater than the threshold pressure level TH controlled by the clutch control pressure and enters a fully stroked non-regulating state if the main line pressure MP is less than the threshold pressure level TH. Thus, once the clutch control pressure is maintained at a particular pressure level and therefore defines the threshold pressure level TH of the clutch trim valve 70, the pressure level of the main line pressure MP determines whether the clutch trim valve 70 is in a regulating or a non-regulating state.

In general, the greater the clutch control pressure applied to the upper chamber 70 the greater the main line pressure MP needed to place the clutch trim valve 70 in the regulating state. Thus, in one embodiment, the ECM 72 in block 500 generates clutch control signals that cause the solenoid valve 430 to apply a clutch control pressure to the upper chamber 470 that is at least sufficient to overcome the upward force of the spring 480 when the control main valve 68 is in a regulating state and is therefore supplying a substantially constant control main pressure CP (e.g. about 100 psi). In another embodiment, the ECM 72 in block 500 simply generates clutch control signals that fully open the solenoid valve 430 to permit the flow of fluid from the control line 76 to the upper chamber 470. In one embodiment, fully opening the solenoid valve 430 results in a threshold pressure level TH of about 130 psi for the clutch trim valve 70.

At block 505, the ECM 72 may develop a main line pressure MP (e.g. about 200 psi) that is greater than the defined threshold pressure level TH (e.g. about 130 psi) for placing the clutch trim valve 70 in a regulating state. In particular, the ECM 72 in one embodiment generates regulator control signals that cause the main regulator valve 66 to develop a main line pressure MP at a first pressure level PL1. In one embodiment, the first pressure level PL1 is a predetermined amount GB (e.g. about 70 psi) above the threshold pressure level TH in order to ensure that the main line pressure MP developed by the main regulator valve 66 is sufficient to place the clutch trim valve 70 in the regulating state. More specifically, the predetermined amount GB above the threshold pressure level TH ensures that any reasonable variance in the regulator control signals generated by the ECM 72 and in the main line valve 66 does not result in the first pressure level PL1 actually developed by the main regulator valve 66 being less than the threshold pressure level TH associated with the regulating state. As a result of the main line pressure MP generated at block 505, the clutch trim valve 70 is placed in a regulating state. Accordingly, the clutch trim valve 70 at block 510 develops and maintains a clutch feed pressure CF at a substantially constant pressure level (e.g. about 130 psi).

At block 515, the ECM 72 adjusts the regulator control signals in order to adjust the main line pressure MP developed by the main regulator valve 66 from the first pressure level PL1 toward a second pressure level PL2. In one embodiment, the second pressure level PL2 corresponds to a pressure level below the threshold pressure level TH associated with the regulating state of the clutch trim valve 70 and may be guard banded in a manner similar to the first pressure level PL in order to ensure the second pressure level PL2 is below the threshold pressure level TH regardless of reasonable variances in generated regulator control signals and the main regulator valve 66. Thus, at block 515, the ECM 72 in one embodiment generates regulator control signals which cause the main regulator valve 66 to reduce the pressure level of the main line pressure MP toward the second pressure level PL2.

In response to adjusting the pressure level of the main line pressure MP toward the second pressure level PL2, the clutch trim valve 70 adjusts the pressure level of the clutch feed pressure CF at block 520 and updates the status signals accordingly at 525. In particular, as discussed above, the clutch trim valve 70 remains in a regulating state in which the clutch trim valve 70 develops and maintains the clutch feed pressure CF at a substantially constant pressure level (e.g. about 130 psi) as long as the main line pressure MP remains above the threshold pressure level TH. Moreover, when in the regulating state, the clutch trim valve 70 decouples the control line 76 from the pressure switch 450 thus causing the pressure switch 450 to generate status signals that indicate the pressure switch 450 is in an inactive state (e.g. closed) and the clutch trim valve 70 is in a regulating state.

Further, when the main line pressure MP falls below the threshold pressure level TH, the clutch trim valve 70 enters a fully stroked non-regulating state in which the clutch trim valve 70 develops the clutch feed pressure CF at a pressure level that varies with the pressure level of the main line pressure MP. Furthermore, the clutch trim valve 70 delivers fluid to the pressure switch 450 thus causing the pressure switch 450 to generate status signals that indicate the pressure switch 450 is in an active state (e.g. open) and the clutch trim valve 70 is in a non-regulating state.

At block 530, the ECM 72 based upon status signals received from the clutch trim valve 70 determines whether the first calibration point CAL1 has been reached. In particular, the ECM 72 determines that the first calibration point CAL1 has been reached if the status signals indicate a transition of the pressure switch 450 between active and inactive states (e.g. between open and closed states) which corresponds to a transition of the clutch trim valve 70 between regulated and non-regulating states. If the ECM 72 determine that the first calibration point CAL1 has not been met, the ECM 72 may return to block 515 to further adjust regulator control signals in order to further adjust the pressure level of the main line pressure MP toward the second pressure level PL2.

In response to determining that the first calibration point CAL 1 has been reached, the ECM 72 may determine one or more calibration parameters for the regulator control signals at block 535. In particular, the ECM 72 may identify the regulator control signals that resulted in the first calibration point CAL1 being reached and identifying regulator control signals that are expected to generate a main line pressure MP associated with the first calibration point CAL1. In an embodiment in which the ECM 72 adjusts the main line pressure MP by adjusting the electrical current of the regulator control signals, the ECM 72 may subtract an electrical current level of the generated regulator control signals from the electrical current level of the expected regulator control signals to obtain an electrical current offset of the calibration parameters. The ECM 72 may then calibrate main modulation by increasing or decreasing further regulator control signals based upon the determined electrical current offset.

At block 540, the ECM 72 may adjust the main line pressure MP from the second pressure level PL2 toward the first pressure level PL1 in order to detect a second calibration point CAL2. As mentioned above, the first pressure level PL1 corresponds to a pressure level above the second pressure level PL2 and above the threshold pressure level TH associated with the regulating state of the clutch trim valve 70. Thus, at block 540, the ECM 72 in one embodiment generates regulator control signals that cause the main regulator valve 66 to increase the pressure level of the main line pressure MP toward the first pressure level PL1.

In response to adjusting the pressure level of the main line pressure MP toward the first pressure level PL1, the clutch trim valve 70 adjusts the pressure level of the clutch feed pressure CF at block 545 and updates the status signals accordingly at 550. As mentioned above, the clutch trim valve 70 develops the clutch feed pressure CF at a pressure level that varies with the pressure level of the main line pressure MP when in the non-regulating state and maintains the clutch feed pressure CF at a substantially constant pressure level (e.g. 130 psi) when in the regulating state. At the second pressure level PL2, the clutch trim valve 70 is in the non-regulating state and at the first pressure level PL1 is in the regulating state. Thus, in response to the ECM 72 increasing the main line pressure at block 540, the clutch trim valve 70 at some point transitions from the non-regulating state to the regulating state.

At block 555, the ECM 72 based upon status signals received from the clutch trim valve 70 determines whether the second calibration point CAL2 has been reached. In particular, the ECM 72 determines that the second calibration point CAL2 has been reached if the status signals indicate a transition of the pressure switch 450 between inactive and active states (e.g. between closed and open states) which corresponds to a transition of the clutch trim valve 70 between non-regulated and regulating states. If the ECM 72 determines that the second calibration point CAL1 has not been met, the ECM 72 may return to block 540 to further adjust regulator control signals in order to further adjust the pressure level of the main line pressure MP toward the first pressure level PL1.

In response to determining that the second calibration point CAL2 has been reached, the ECM 72 may determine one or more calibration parameters for the regulator control signals at block 560. In particular, the ECM 72 may identify the regulator control signals that resulted in the second calibration point CAL2 being reached and identifying regulator control signals that are expected to generate a main line pressure MP associated with the second calibration point CAL2. In an embodiment in which the ECM 72 adjusts the main line pressure MP by adjusting the electrical current of the regulator control signals, the ECM 72 may subtract an electrical current level of the generated regulator control signals from the electrical current level of the expected regulator control signals to obtain an electrical current offset of the calibration parameters. The ECM 72 may then calibrate main modulation by increasing or decreasing further regulator control signals based upon determined electrical current offsets.

The above main modulation calibration method depicted in FIGS. 7 and 8-10 reduces the main line pressure MP from the first pressure level PL1 above the threshold pressure level TH toward the second pressure level P2 below the threshold pressure level TH to obtain the first calibration point CAL1 and then increases the main line pressure MP from the second pressure level P2 toward the first pressure level PL1 to obtain the second calibration point CAL2. However, in other embodiments, the first pressure level PL1 may be below the threshold pressure level TH and the second pressure level PL2 may be above the threshold pressure level TH, thus resulting in a main modulation calibration method that increases the main line pressure MP to obtain the first calibration point PL1 and then decreases the main line pressure MP to obtain the second calibration point P2 as shown in FIG. 8.

Furthermore, the above modulation calibration method of FIGS. 7 and 8-10 calibrates regulator control signals based upon calibration parameters obtained via the first calibration point PL1 and then further calibrates the regulator control signals based upon calibration parameters obtained via the second calibration point PL2. In other embodiments, the ECM 72 may obtain the first calibration point PL1 and the second calibration point PL2, determine calibration parameters based upon regulator control signals associated with both calibration points PL1, PL2, and calibrate further regulator control signals after detecting both calibration points PL1, PL2. Moreover, while the above main modulation calibration method identifies two calibration points, some main modulation calibration methods may use a single calibration point or may use more than two calibration points.

The above main modulation calibration method of FIGS. 7 and 8-10 uses the same first pressure level PL1, second pressure level PL2, and threshold pressure level TH regardless of whether the ECM 72 is increasing the main line pressure MP to obtain a calibration point or decreasing the main line pressure MP to obtain a calibration point. In some embodiments, as shown in FIG. 9, the clutch trim valve 70 may have a first threshold pressure level TH1 associated with a transition from a regulating state to a non-regulated and a second threshold pressure level TH2 associated with a transition from non-regulating state to a regulating state. Furthermore, regardless of whether clutch trim valve 70 has two threshold pressure levels TH1, TH2, the ECM 72 may use two upper pressure levels U1, U2 and two lower pressure levels L1, L2 as shown in FIG. 10. In particular, the ECM 72 may use a first upper pressure level U1 and a first lower pressure level L1 when decreasing the main line pressure MP to obtain a first calibration point CAL 2 and may use a second upper pressure level U2 and a second lower pressure level L2 when increasing the main line pressure MP to obtain a second calibration point CAL2.

While the disclosure has been illustrated and described in detail in the drawings and foregoing description, such an illustration and description is to be considered as merely illustrative and not restrictive in character, it being understood that only illustrative embodiments have been shown and described and that all changes and modifications that come within the spirit of the disclosure are desired to be protected.

What is claimed is:

1. A method, comprising, at an electronic control module for a transmission:
   generating regulator control signals that cause a main regulator valve of the transmission to develop a main line pressure having a first pressure level and a control main valve of the transmission to develop a control main pressure based upon the main line pressure,
   generating clutch control signals that cause a clutch trim valve of the transmission to develop from the control main pressure a clutch control pressure that defines a threshold pressure level, the threshold pressure level corresponding to a transition point between a regulating state and a non-regulating state of the clutch trim valve, the regulating state being a state in which the clutch trim valve is neither fully stroked nor fully destroked,
   adjusting regulator control signals to cause the main regulator valve to adjust the main line pressure toward a second pressure level,
   receiving status signals from the clutch trim valve that indicates whether the clutch trim valve is in the regulating state,
   generating one or more calibration parameters based upon regulator control signals that caused receipt of status signals that indicate a transition between the regulating state and the non-regulating state, and
   modulating the main line pressure developed by the main regulator valve by generating further regulator control signals based upon the one or more calibration parameters.

2. The method of claim 1, wherein the first pressure level is greater than the threshold pressure level, the second pressure level is less than the threshold pressure level, and adjusting regulator control signals causes the main regulator valve to reduce the main line pressure from the first pressure level toward the second pressure level.

3. The method of claim 2, further comprising generating a status signal that indicates the clutch trim valve has transitioned between the regulating state and the non-regulating state in response to the main line pressure being less than the threshold pressure level.

4. The method of claim 1, wherein the first pressure level is less than the threshold pressure level, the second pressure level is greater than the threshold pressure level, and adjusting regulator control signals causes the main regulator valve to increase the main line pressure from the first pressure level toward the second pressure level.

5. The method of claim 4, further comprising generating a status signal that indicates the clutch trim valve has transitioned between the non-regulating state and the regulating state in response to the main line pressure being greater than the threshold pressure level.

6. The method of claim 1, further comprising
   updating a status of a pressure switch of the clutch trim valve in response to the main line pressure being less than the threshold pressure level, and
   generating a status signal to indicate the status of the pressure switch in response to updating the status of the pressure switch.

7. The method of claim 1, further comprising
   de-activating a pressure switch of the clutch trim valve in response to the main line pressure being less than the threshold pressure level, and generating a status signal to indicate an inactivate state of the pressure switch in response to de-activating the pressure switch.

8. The method of claim 1, further comprising
activating a pressure switch of the clutch trim valve in response to the main line pressure being less than the threshold pressure level, and
generating a status signal to indicate an activate state of the pressure switch in response to activating the pressure switch.

9. The method of claim 1, wherein the first pressure level is greater than the threshold pressure level, the second pressure level is less than the threshold pressure level, and adjusting regulator control signals causes the main regulator valve to reduce the main line pressure from the first pressure level toward the second pressure level, further comprising
generating a status signal that indicates the clutch trim valve has transitioned between the regulating state and the non-regulating state in response to the main regulator valve reducing the main line pressure below the threshold pressure level,
after generating the status signal, further adjusting the regulator control signals to cause the main regulator valve to increase the main line pressure from the second pressure level toward the first pressure level, and
generating another status signal that indicates the clutch trim valve has transitioned between the non-regulating state and the regulating state in response to the main regulator valve increasing the main line pressure above the threshold pressure level associated.

10. The method of claim 1, further comprising
identifying regulator control signals that are expected to cause the clutch trim valve to transition between the regulating state and the non-regulating state, and
generating the one or more calibration parameters based further upon regulator control signals that are expected to cause the clutch trim valve to transition between the regulating state and the non-regulating state.

11. The method of claim 1, further comprising
identifying regulator control signals that are expected to cause the clutch trim valve to transition between the regulating state and the non-regulating state, and
generating the one or more calibration parameters based upon a difference between regulator control signals that caused the clutch trim valve to transition between the regulating state and the non-regulating state and regulator control signals that are expected to cause the clutch trim valve to transition between the regulating state and the non-regulating state.

12. An electro-hydraulic control system for a transmission, comprising
a main regulator valve to modulate a main line pressure of fluid of the electro-hydraulic control system based upon regulator control signals,
a control main valve to receive fluid at the main line pressure, and to develop a control main pressure based upon the main line pressure,
a clutch trim valve to exert a clutch feed pressure upon a clutch of the transmission based upon fluid received at the control main pressure, fluid received at the main line pressure, and a clutch control signal, and to generate status signals that indicate whether the clutch trim valve is in a regulating state, the regulating state being a state in which the clutch trim valve is neither fully stroked nor fully destroked, and
an electronic control module to generate regulator control signals, to generate clutch control signals to define a regulation point of the clutch trim valve, to detect via the status signal whether the main line pressure has placed the clutch trim valve in a regulating state, and to calibrate regulator control signals based upon regulator control signals that indicate the clutch trim valve transitioned between the regulating state and a non-regulating state.

13. The electro-hydraulic control system of claim 12, wherein the electronic control module is to
determine a calibration parameter based upon regulator control signals that caused the clutch trim valve to transition between the regulating state and the non-regulating state, and
generate calibrated regulator control signals based upon the calibration parameter.

14. The electro-hydraulic control system of claim 12, wherein the clutch trim valve comprises a pressure switch that generates the status signal based upon fluid pressure applied to the pressure switch.

15. The electro-hydraulic control system of claim 14, wherein the clutch trim valve further comprises
a solenoid valve to receive the control main pressure and clutch control signals, and to develop a clutch control pressure based upon the received control main pressure and clutch control signals, and
a pressure regulator valve designed regulate the main line pressure based upon a threshold pressure level controlled by the clutch control pressure, and to selectively deliver fluid to the pressure switch based upon a predetermined relationship between the main line pressure and the threshold pressure level.

16. The electro-hydraulic control system of claim 14, wherein the clutch trim valve comprises
a solenoid valve to develop a clutch control pressure based upon fluid at the control main pressure and clutch control signals,
a valve body having a plurality of ports and an axial bore, the plurality of ports comprising a port to be coupled to fluid at the clutch control pressure, a port to be coupled to fluid at the control main pressure, a port to be coupled to fluid at the main line pressure, and a port coupled to the pressure switch, and
a valve member movably positioned in the axial bore of the valve body, the valve member comprising a plurality of lands that selectively couples ports of the plurality of ports based upon position of the valve member in the axial bore,
the plurality of ports and the valve member arranged to deliver fluid at the control main pressure to the pressure switch in response to the main line pressure being less than a threshold pressure level controlled by the clutch control pressure.

17. The electro-hydraulic control system of claim 16, wherein
the clutch trim valve further comprises a spring positioned in the axial bore of the valve body to bias the valve member toward an end of the valve body, and
the spring, the valve body, and the valve member are arranged to develop the threshold pressure level associated with the regulating state based upon the clutch control pressure.

18. A vehicle transmission comprising,
a plurality of gearsets and clutches that selectively define a speed ratio, and
an electro-hydraulic control system to control the transmission, comprising
a main regulator valve to modulate a main line pressure based upon regulator control signals, a control main valve to develop a control main pressure based on the main line pressure, a plurality of clutch trim valves, each clutch trim valve to develop a clutch feed pressure for a corresponding clutch of the transmission based upon clutch control signals, the main line pressure and the control main pressure, and at least one clutch trim valve of the plurality of clutch trim valves to generate a status signal that indicates whether the clutch trim valve is in a regulating state, the regulating state being a state in which the clutch trim valve is neither fully stroked nor fully destroked, and an electronic control module to generate clutch control signals that adjust the clutch feed pressure of associated clutch trim valves, to detect via the status signal whether the at least one a clutch trim valve is in the regulating state, and to calibrate regulator control signals in response to status signals that indicate that the clutch trim valve has transitioned to a non-regulating state.

19. The vehicle transmission of claim 18, wherein the clutch trim valve includes a pressure switch to activate the status signal in response to receiving fluid at the control main pressure, a valve body having a port coupled to fluid at the control main pressure, a port to deliver fluid at the clutch feed pressure, and a port coupled to the pressure switch, the clutch trim valve further includes a valve member positioned in a bore of the valve body to deliver fluid at the control main pressure to the pressure switch in response to the main line pressure being less than a threshold pressure level, and the electronic control module determines that clutch has transitioned to the non-regulating state based upon the status signal.

20. The vehicle of claim 19, wherein the electronic control module determines a calibration parameter for regulator control signals based upon regulator control signals associated with the clutch trim valve transitioning to the non-regulating state.

* * * * *